(12) United States Patent
Yuratich et al.

(10) Patent No.: US 6,653,839 B2
(45) Date of Patent: Nov. 25, 2003

(54) ELECTRICAL MEASUREMENT APPARATUS AND METHOD FOR MEASURING AN ELECTRICAL CHARACTERISTIC OF AN EARTH FORMATION

(75) Inventors: Michael Andrew Yuratich, Hamble (GB); Andrew David Jewell, Great Hollands (GB)

(73) Assignee: Computalog USA Inc., Fort Worth, TX (US)

( * ) Notice: Subject to any disclaimer, the term of this patent is extended or adjusted under 35 U.S.C. 154(b) by 0 days.

(21) Appl. No.: 10/032,981

(22) Filed: Dec. 28, 2001

(65) Prior Publication Data

US 2002/0153896 A1 Oct. 24, 2002

(30) Foreign Application Priority Data

Apr. 23, 2001 (GB) .............................. 0109882

(51) Int. Cl.$^7$ ................................ G01V 3/18
(52) U.S. Cl. ...................... 324/355; 324/375
(58) Field of Search ................ 324/347, 351, 324/355, 367, 373, 374, 375; 73/152, 17

(56) References Cited

U.S. PATENT DOCUMENTS

| | | | | |
|---|---|---|---|---|
| 3,638,105 A | * | 1/1972 | Schuster | 324/351 |
| 3,638,106 A | * | 1/1972 | Cram | 324/351 |
| 3,715,653 A | * | 2/1973 | Sauter | 324/351 |
| 3,988,669 A | | 10/1976 | Fasching | |
| 4,122,387 A | * | 10/1978 | Ajam et al. | 324/375 |
| 4,251,773 A | | 2/1981 | Cailliau et al. | |
| 4,254,406 A | * | 3/1981 | Meares | 341/157 |
| 4,290,018 A | * | 9/1981 | Rhodes | 324/255 |
| 4,468,623 A | | 8/1984 | Gianzero et al. | |
| 4,545,242 A | | 10/1985 | Chan | |
| 4,567,759 A | | 2/1986 | Ekstrom et al. | |
| 4,608,636 A | * | 8/1986 | Beals | 702/6 |
| 4,692,707 A | * | 9/1987 | Locke et al. | 324/374 |
| 4,692,908 A | | 9/1987 | Ekstrom et al. | |
| 4,851,781 A | | 7/1989 | Marzetta et al. | |
| 4,862,090 A | | 8/1989 | Vannier et al. | |
| 5,008,625 A | | 4/1991 | Chen | |
| 5,012,193 A | | 4/1991 | Chen | |
| 5,038,378 A | | 8/1991 | Chen | |
| 5,101,104 A | | 3/1992 | Schroeder | |
| 5,162,740 A | * | 11/1992 | Jewell | 324/347 |
| 5,339,036 A | * | 8/1994 | Clark et al. | 324/338 |
| 5,355,950 A | | 10/1994 | Zwart | |
| 6,373,254 B1 | * | 4/2002 | Dion et al. | 324/369 |

FOREIGN PATENT DOCUMENTS

| | | |
|---|---|---|
| EP | 0544584 | 6/1993 |
| GB | 2208717 | 6/1989 |
| GB | 2253908 | 11/1992 |
| WO | WO 0079307 | 12/2000 |

OTHER PUBLICATIONS

Horowitz et al. "The Art of Electronics", Cambridge University Press, Cambridge UK, 1980, pp. 26–27, 178–180, 222–223, 282–284.*

* cited by examiner

*Primary Examiner*—Jay Patidar
*Assistant Examiner*—Darrell Kinder
(74) *Attorney, Agent, or Firm*—Geoffrey A. Mantooth

(57) ABSTRACT

In an electrical measurement apparatus and method for measuring an electrical characteristic of an earth formation, such as in a hole drilled for the exploration for hydrocarbons, a detection portion has an operational amplifier operating in voltage follower mode, with a measurement resistor in the feedback loop. The detection portion will typically include a plurality of sensor elements, and the operational amplifier can be switched between the sensor elements. The apparatus also includes a measurement portion adapted to measure the current flow through the measurement resistor, the calculation portion including an integrator.

19 Claims, 3 Drawing Sheets

ELECTRICAL MEASUREMENT APPARATUS AND METHOD FOR MEASURING AN ELECTRICAL CHARACTERISTIC OF AN EARTH FORMATION

FIELD OF THE INVENTION

The invention relates to an electrical measurement apparatus and method for measuring an electrical characteristic of an earth formation, and in particular to an apparatus and method for measuring the electrical resistance of rock surrounding a drilled hole. The apparatus and method are likely to find their greatest utility in holes drilled for the exploration for hydrocarbons, and the following description will relate primarily to such use; however, it is to be understood that he invention can be used in other applications also.

BACKGROUND OF THE INVENTION

It has been found that the electrical resistivity or resistance of rock surrounding a drilled hole can be used as a very good indicator of the structure of the rock, i.e. the electrical resistance is very sensitive to the structure of the rock. For example, rock itself, and rock containing oil, has a relatively high electrical resistance, whilst rock containing water and dissolved salts (e.g. brine) has a relatively low resistance.

Much work has been undertaken in recent decades to utilise the changes in electrical resistance adjacent to a drilled hole (and also deeper within the surrounding rock) to determine the structure of the rock, and in particular the likely presence of oil bearing strata therein.

Measurement tools and methods have been developed to measure the electrical resistance in the immediate vicinity of the drilled hole, i.e. within the few centimeters adjacent the drilled hole, and also deeper within the rock surrounding the drilled hole. The tools and methods for the latter type of measurements are typically less precise than those for the former measurements, i.e. in the latter case the measurements cover a larger volume of rock and are therefore less sensitive to small variations within only a part of that rock. The present invention is particularly suited to the former measurements, and is intended to provide very precise measurements (though it could, if desired, also be utilized with the latter measurements).

It is a requirement of measurements in the immediate vicinity of the drilled hole that the measurements be as precise as possible, with a resolution, for example, of as little as 0.1 inches (approximately 2.5 mm).

It will be understood that when measurements are to be taken within a drilled hole, the measurement tool is first introduced into the hole, and moved to the distal end of the zone of interest. The tool is typically connected by a cable to a winch at the surface, and the measurements are taken as the tool is pulled out of the hole, past the region of interest. It is not economic to allow the tool to stop for each measurement, nor is it desirable since if the tool stops it is likely to stick in position (within the mud which will typically be present within the hole, which mud can readily cause the tool to stick to the wall of the hole). A typical rate of movement of the tool during measurement is approximately 30 feet per minute (approximately 0.167 meters/second), and this speed is generally accepted as a realistic compromise between economics (the desire to take the measurements as quickly as possible so that, for example, drilling can subsequently be continued), the ability to take sufficient measurements sufficiently quickly, and the likelihood of the tool sticking.

To take a measurement every 0.1 inches whilst the tool is travelling at 30 feet per minute requires a measurement to be taken every one sixtieth of a second.

It is also known that in more precise measurements several sensor elements can be arranged on a single sensor pad, a measurement being taken from each sensor element. A known design of sensor pad has twenty five sensor elements, for example.

When taking resistance measurements in these applications, it is typical to utilize an alternating applied voltage. This has the advantage that electrolytic and other contact-induced electrical effects between the sensor elements and the rock can be ignored, it being understood that those effects induce DC voltages, or at least voltages which are sufficiently invariant to be considered to be DC. There is, however, a practical upper limit to the frequency which can be used, since higher frequencies attenuate more within the rock, and are prone to phase shifts between the applied voltage and measured current. Generally, frequencies in the range from 5 kHz to 20 kHz can be used, with the embodiment described herein using a frequency of around 7.5 kHz.

FIG. 1 demonstrates the principle involved in taking an electrical resistance measurement of the rock surrounding a drilled hole, which principle underlies the measurement methods used in many prior art applications, and also within the present invention. In FIG. 1, a hole 2 has been drilled within formation 4. A measurement tool (not shown) has been inserted into the hole, and includes a sensor element 6, which sensor element is surrounded by a guard element 8. The sensor element 6 and guard element 8 are connected to a voltage generator 10, supplying an alternating voltage. The electrical circuit is completed by an electrode 12 in contact with the rock remote from the sensor element 6 and guard element 8. Since the electrode 12 is remote from the sensor element 6 and guard element 8, it is typically considered as electrical infinity.

FIG. 1 also shows, in dashed outline, a representation of the current flow through the rock, i.e. between the sensor element 6 and guard element 8, and the electrode 12. It is desired that the electrode 12 be sufficiently far from the sensor element 6 that the current flow is substantially perpendicular to the rock surface for a distance within the rock, so that the current flow through an imaginary cylinder 14 is substantially linear and uniform.

If the current flow through the imaginary cylinder 14 is linear and uniform, the current flowing through the cylinder will be dependent upon the electrical resistance of the rock within the cylinder 14, and this current corresponds to the current flowing through the line 16.

It will be understood that the guard element 8 serves to reduce (and hopefully eliminate) the edge effects of the sensor element 6. It is desired that the voltage of the guard element 8 matches the voltage of the sensor element 6 at all times, so that no current flows through the rock between the sensor element and the guard element. This will also help to ensure that the current flowing though the imaginary cylinder 14 is linear and uniform.

The design of the sensor element and guard element, as well as other characteristics of the apparatus, which seeks to ensure that the current flow is substantially perpendicular to the rock surface adjacent the sensor element 6 is known in this art as "focussing", and a properly focussed apparatus can be used to determine the current flow through the imaginary cylinder 14 by determining the current flow through the line 16.

From a measurement of the current flowing through the line 16, and a knowledge of the voltage applied by the generator 10, the resistance of the electrical circuit (including the rock within the imaginary cylinder) can be determined from Ohms law. However, it is necessary to apply a calibration factor so that the resistance of the rock within the imaginary cylinder 14 can be determined. The calibration factor will depend upon the particular apparatus, and in particular its geometry and componentry, but once established for a tool will not change unless the apparatus geometry or componentry is changed. In addition, absolute resistance values for the formation 4 are seldom required, but variations in the resistance at different locations within the formation are particularly useful.

DESCRIPTION OF THE PRIOR ART

Early workers in this field utilized a resistor in the line 16 so that a voltage drop across the resistor could be measured and the current flow calculated. However, that method had the disadvantage that the resistor caused a difference in the voltage between the sensor element and the guard element, adversely affecting the focussing of the apparatus. The voltage drop need only be very small, e.g. a few thousandths of the guard voltage, to adversely affect the focussing.

U.S. Pat. No. 4,468,623 utilizes a "transformer", i.e. a separate circuit adjacent the line 16 in which a current is induced, dependent upon the current flow in the line 16. However, even though there is no physical contact between the line 16 and the separate circuit, the transformer would nevertheless cause a voltage drop in the line 16, and could also cause an unwanted phase shift in the current.

Once the current through the sensor element has been detected (more or less accurately, depending upon the method utilized), its value must be calculated and output so that it may be utilized to generate information about the electrical resistance of the rock within the region of interest. However, the signal containing the information about the current flow will typically include a certain amount of noise, and previously it has been sought to reduce the amount of noise by filtering methods.

A perfect filter which removes all of the noise and retains all of the signal is not achievable in practice, and any filtering method will lose some of the signal. Furthermore, a filter will be corrupted to some extent by the continuous nature of the signal, i.e. a filter is not reset between calculations being made upon the signal, and in the case of widely fluctuating signals the filter might contribute to the calculated signal by retaining part of a previous signal. This is particularly important when the short time available for each measurement, whilst the tool is moving to the next measurement position, is considered—since successive measurement signals can vary widely and the time to take a measurement is very short, the "memory effect" is potentially severe.

SUMMARY OF THE INVENTION

The invention seeks to reduce or avoid the above-stated disadvantages with the prior art apparatuses and methods.

According to one aspect of the invention, the apparatus includes a detection portion including an op amp (operational amplifier) acting in "voltage follower" mode, and with a resistor in the feedback loop. It will be understood that the op amp in this mode will drive whatever current is necessary (within the limits of the power supply and circuit) to ensure that the voltage at the output (to which the sensor element is connected) will always be equal to the voltage at the input (to which the generator is connected). The resistor is located within the feedback loop between the op amp and the sensor element. The voltage drop across the resistor can be measured, and the current flowing through the resistor (and hence from the sensor element and into the rock) can be calculated. The resistor can be of relatively large value so that the voltage drop is relatively large and readily measurable.

Preferably, there is a plurality of sensor elements. It is not usually practical to provide a separate op amp for each sensor element, and the apparatus can include means to switch a single op amp between the sensor elements in sequence, so that the outputs from the sensor elements are multiplexed.

The apparatus also includes a calculation portion, the purpose of which is to provide an output signal corresponding to the current flow measured by the detection portion. According to another aspect of the invention the apparatus includes an integrator within the calculation portion.

An integrator provides an output signal indicative of the current flow. The integrator can be reset to a datum value (i.e. zero) after each measurement calculation, so that no memory of the previous calculation is retained. In addition, the integrator can virtually eliminate the noise whilst retaining all of the signal, since the value of the noise will alternately add to and subtract from the underlying signal, in approximately equal amounts, so that the noise can be effectively summed substantially to zero.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
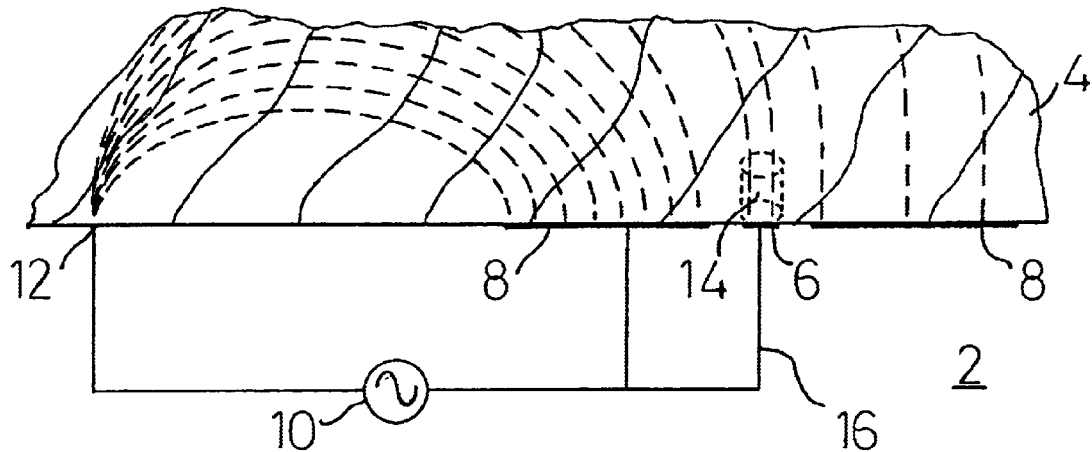
FIG. 1 provides a representation of the principle of operation of the present invention, and also of prior art arrangements.

The detection portion 20 of the apparatus includes an op amp 22 located within the line 16 between the generator 10 and the sensor element 6. The op amp is in "voltage follower" mode, in which the voltage at the point 32 matches the voltage at non-inverting input 24, i.e. it matches the voltage output from the generator 10 at a particular instant. To operate as a voltage follower the op amp has a feedback loop connected between its output and the inverting input 26, and it is arranged that a resistor 30 lies within the feedback loop, specifically between the op amp and its notional output point 32.

Thus, the effect of placing the resistor 30 into the feedback loop between the output of the op amp 22 and the sensor element 6 is that the point 32 can be considered as the effective output of the op amp 22, and when operating in voltage follower mode the op amp will ensure that the voltage at the point 32 will always match that at the input 24 (subject to the limits set by the power supply (not shown) and other circuit componentry). Since the point 32 is connected to the sensor element 6 and the input 24 is also connected to the guard element 8, it is ensured that at any instant the voltage at the sensor element 6 is the same as that of the guard element 8, so that the tool can be properly focussed.

Figure 2:
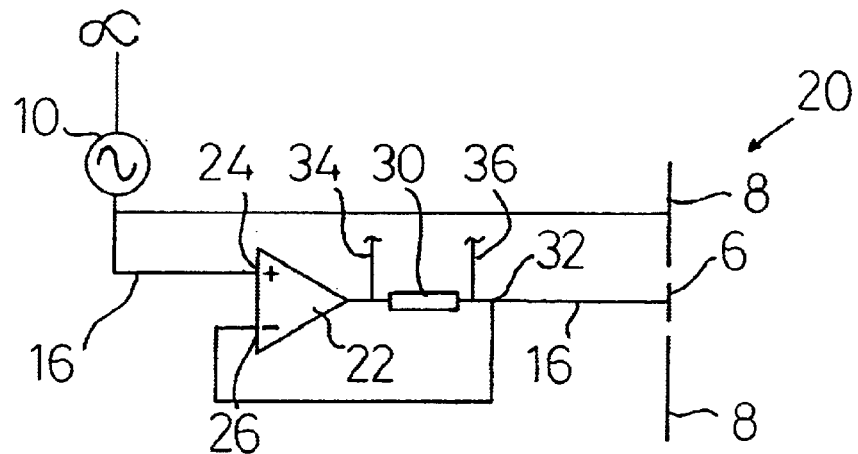
FIG. 2 shows a schematic representation of a part of the detection portion of an apparatus according to the invention which is suitable for use with a single sensor element.

In FIG. 2 (as in FIG. 1) the electrical circuit is completed by connecting the generator also to electrical infinity, i.e. a point in contact with the rock or earth suitably remote from the sensor element 6.

The apparatus includes a voltage measuring means connected across the resistor 30, i.e. the lines 34 and 36 can be connected to a voltmeter or equivalent. Because in the present invention the resistor is located within the feedback loop of an op amp operating in voltage follower mode its value can be relatively large (for example 470 Ohms), and it will be understood that it is relatively simple to arrange a measurement of the voltage drop across such a resistor. The voltage drop across the resistor 30 is proportional to the current flowing through the line 16, which is the same current as that flowing through the imaginary cylinder of rock 1 surrounding hole 2.

It will be understood by those skilled in this art that the dynamic range of the measured currents can in some cases vary by 10,000:1, so that it is necessary that the voltage drop across resistor 30 can vary between 100 mV and 1 V for example.

As indicated above, it is desirable that the tool include a plurality of sensor elements 6, but that it is not usually practical to include an op amp, and a circuit such as that shown, within the tool, for a large number of sensor elements. Accordingly, in the preferred embodiments a single op amp can be used with a number of sensor elements, the resistance measurements being taken for each sensor element sequentially.

Figure 3:
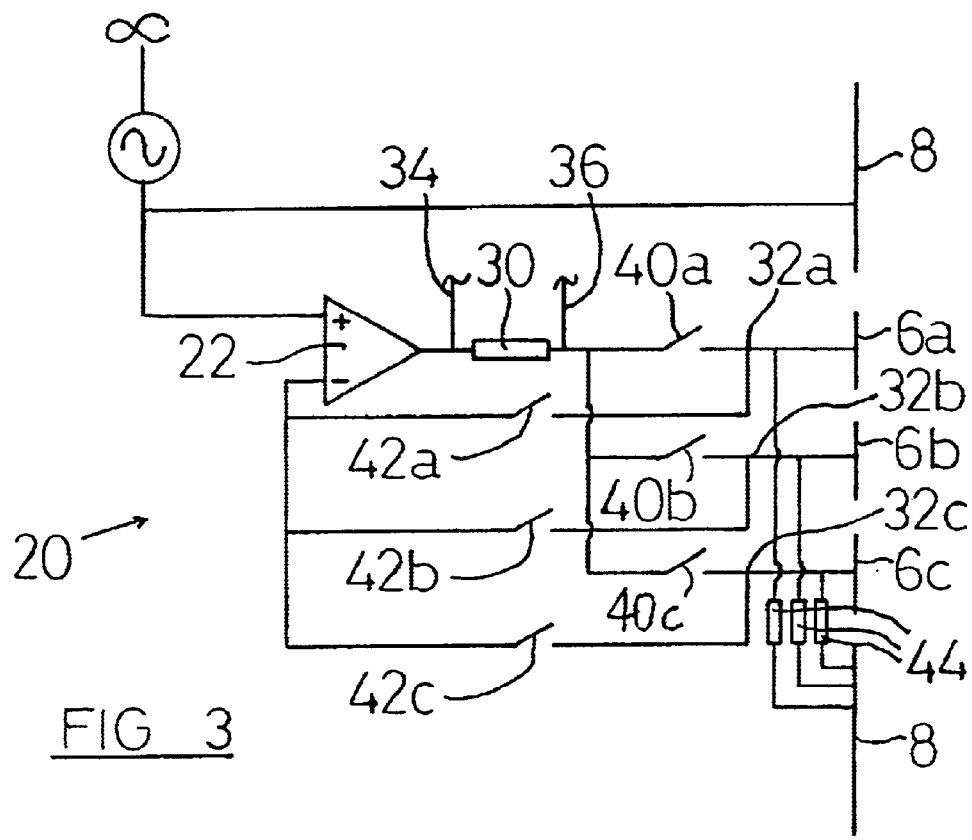
FIG. 3 shows a schematic representation of a part of the detection portion of an apparatus according to the invention which is suitable for use with three sensor elements.

One suitable arrangement for use with three sensor elements is shown in FIG. 3 (though it will be understood that the principle of operation can be used for two or more sensor elements, as desired).

In arrangements such as that of FIG. 3, switches are required to switch the op amp 22 between the respective sensor elements 6a,b,c, i.e. so that the current flow through the rock adjacent each sensor element can be measured sequentially. Accordingly, the circuit of FIG. 3 includes three sets of two switches 40a,b,c and 42a,b,c. Two switches (e.g. 40a and 42a) are required for each sensor element since it is necessary to switch both the sensor element (6a) and the feedback loop. Specifically, it is necessary that the switch 40a,b,c be located within the feedback loop, i.e. between the op amp and the respective point 32a,b,c, so that the resistance of the switch does not affect the result, as above explained.

The switch 40a can be used to connect and disconnect the sensor element 6a from the op amp 22. However, it is also necessary to include switch 42a to connect and disconnect the feedback loop from the sensor element 6a. The presence of the switch 42a within the feedback loop does not affect the measurements since it is a feature of an op amp that substantially no current flows along the feedback loop, so that the voltage drop across the switch 42a is zero.

The switches 40a,b,c and 42a,b,c are preferably electronic switches, and analogue components of this type are well known.

The apparatus of FIG. 3 operates as follows: when the current to sensor element 6a is being detected, the switches 40a and 42a are closed, and the remaining switches are open. The op amp 22 ensures that the voltage at the point 32a, and thus at the sensor element 6a, matches the voltage of the guard element 8. However, it is necessary also that the other sensor elements 6b and 6c closely match the voltage of the guard element to retain the desired overall focussing of the apparatus (i.e. if the voltage of the sensor elements 6b and 6c was not controlled current flows and edge effect errors could arise between adjacent sensor elements). In order to substantially to equalize the voltage between the sensor elements 6b and 6c and the guard element 8, a series of small resistors 44 is utilized (the value of these resistors may be 10 Ohms for example) interconnecting the guard element with each of the sensor elements 6a, 6b and 6c.

It will be noted that the resistors are permanently connected between the guard element 8 and the sensor elements 6a, 6b and 6c, but the presence of these resistors does not adversely affect the measurements made since when the current through a particular sensor element is being detected (6a in FIG. 3), its voltage exactly matches that of the guard element 8 as above indicated, so that no current flows through the resistor connected to that particular sensor element.

When it is desired to terminate the detection of the current flowing through the sensor element 6a and to commence the detection of the current flowing through the sensor element 6b, the switches 40a and 42a are opened, and the switches 40b and 42b are closed. This has the effect of matching the voltage at point 32b (and thus at sensor element 6b) with the output of the voltage generator 10.

Similarly, when it is desired to terminate the detection of the current flowing through the sensor element 6b and to commence the detection of the current flowing through the sensor element 6c, the switches 40b and 42b are opened, and the switches 40c and 42c are closed. This has the effect of matching the voltage at point 32c (and thus at sensor element 6c) with the output of the voltage generator 10.

In this way, the switches 40a–c, 42a–c can be opened and closed sequentially, and the voltage drop across the resistor 30 will comprise a series of values corresponding to the sequential current flows through the imaginary cylinders of rock adjacent the sensor elements 6a, 6b and 6c as those sensor elements are moved along the hole. The voltage drop across the resistor 30 is determined by way of calculations performed upon the voltages detected by the lines 34 and 36, the calculations being performed by the calculation portion of the apparatus as explained below.

Figure 4:
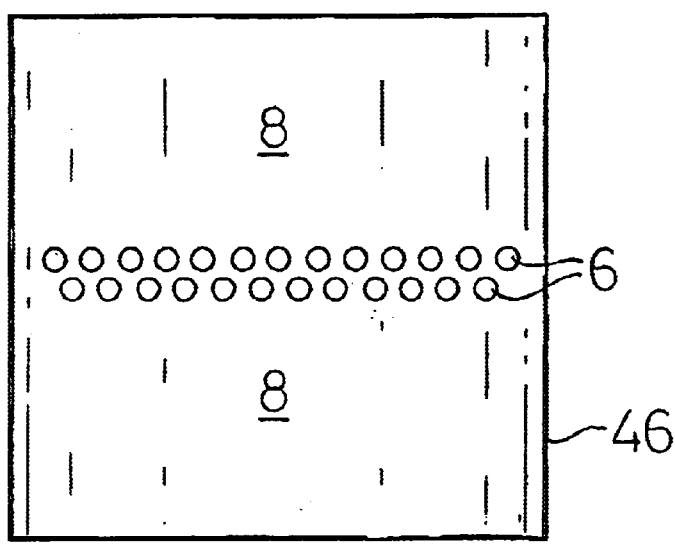
FIG. 4 shows a possible arrangement of twenty five sensor elements on a sensor pad.

It will be understood that the principle of operation for three sensor elements of FIG. 3 can be applied (within reason) to any desired number of sensor elements. FIG. 4 shows an arrangement of twenty five sensor elements 6 arranged upon a single sensor pad 46. The sensor elements in this embodiment are arranged in two rows, one row containing thirteen sensor elements the other row containing twelve sensor elements. It will be understood that many different numbers of sensor elements could be used with the invention, and also many different arrangements upon a sensor pad. It is of course necessary that the sensor elements are electrically disconnected from the guard element 8, and this can be arranged by the provision of a suitable insulator (not shown) surrounding each sensor element 6.

In general it is desired that the sensor elements in one row overlie the gaps between the sensor elements in the other row, so that the sensor elements can together provide a complete resistance measurement around a specific proportion of the periphery of the hole. It will be understood that the sensor pad 46 may be carried by one arm of a multi-arm tool, the function of which tool is to press the sensor pad 46 against the surface of the rock 4 as the tool is moved along the hole 2. The tool may carry six sensor pads 46, so that it can provide a resistance measurement for six spaced portions of the periphery of the hole 2.

In an embodiment such as that of FIG. 4, in order to minimize electrical interference and multiplication of wiring, it is desired that the detection and calculation portion of the apparatus be arranged within the sensor pad 46. This determines the requirement for a single op amp to be sequentially connected to the sensor elements, since there is not sufficient space for twenty five op amps and their associated circuitry within the pad 46. In addition, such an arrangement would result in a single output line from the sensor pad 46, which line can be connected to the surface (together with the lines from the other sensor pads) by way of a cable, so simplifying the electrical connections which must be made to the sensor pad. Whilst such an arrangement is desirable, it is not always practical in terms of the space available within the sensor pad, and it is expected that the detection portion of the circuit will typically be arranged within the sensor pad whilst the calculation portion of the circuit is located elsewhere upon the tool.

It will be understood that in a sensor pad having twenty five sensor elements 6, there must be twenty five sets of switches 40, 42. These switches 40, 42 could be provided on three integrated circuits, each comprising eight sets of switches, and an integrated circuit comprising one set of switches, which components are well known to those skilled in the art.

Figure 5:
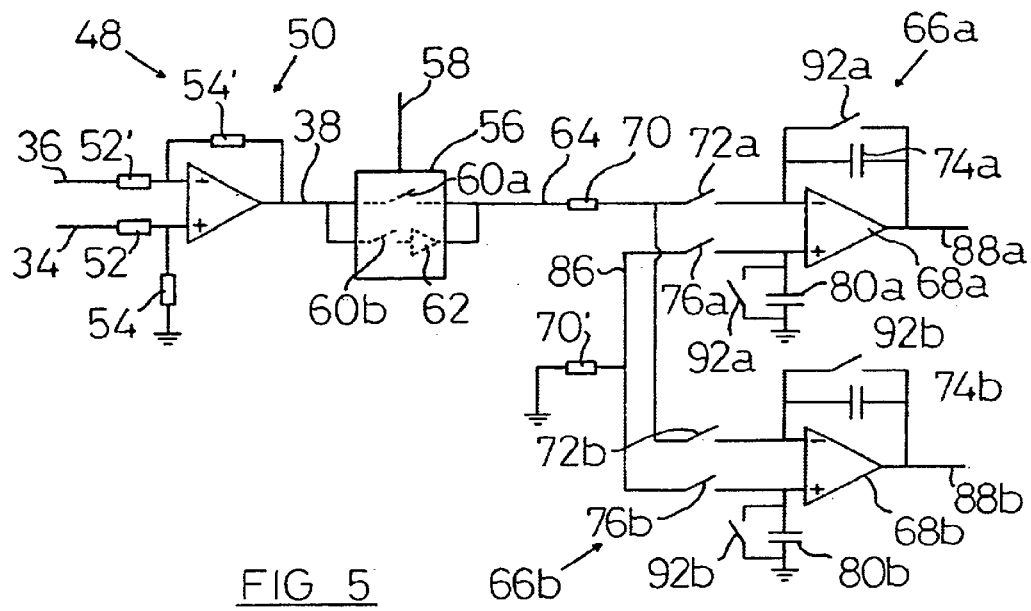
FIG. 5 shows a schematic representation of a part of the calculation portion of the apparatus.

The calculation portion 48 of the apparatus is shown in FIG. 5. This portion has an input connected directly to the output of the detection portion. The first component in the calculation portion is a differentiating means, such as differential amplifier 50 (though it will be understood that in an alternative embodiment the differential amplifier could form (the final) part of the detection portion of the circuit). The signal lines 34 and 36 communicate the voltage signals from either side of the resistor 30 to the non-inverting input and inverting input, respectively, of an op amp, by way of respective resistors 52 and 52' (which are of equal resistance). The non-inverting input of the op amp is connected to earth by way of a resistor 54, and the inverting input is connected to the output of the op amp by way of a similar-value resistor 54'. It will be understood that the output signal passing along line 38 corresponds to the difference between the magnitude of the signals passing along lines 34 and 36, and so corresponds to the voltage drop across the resistor 30. The signal passing along the line 38 can be amplified by the gain of the differential amplifier 50, which is dependent upon the ratio between the resistances of resistors 54,54' and 52,52'.

The calculation portion incorporates a phase sensitive rectifier 56, to which the line 38 is connected. Thus, phase sensitive rectifier 56 is located upstream of the integrator and downstream of the differentiating amplifier. In addition, the phase sensitive rectifier receives a signal directly from the voltage generator 10 along line 58. Accordingly, the calculations can be synchronized with the alternating voltage output from the generator 10. For this reason, it is important to set up the apparatus to eliminate significant phase shift between the voltage output from the generator 10 and the current flowing through the formation 4 surrounding the hole 2. This effectively limits the separation of the electrode 12 from the sensor elements 6, and the frequency which can be used.

Specifically, it is important that the generator 10 controls the calculation portion of the apparatus, and that the apparatus does not rely upon for example a change of polarity of the signal passing along the lines 34, 36 or 38 to control the calculations, since the presence of noise will likely adversely affect the point at which the signal changes polarity.

As above indicated, to effect a resistance measurement every 0.1 inches when the sensor element is travelling at 30 feet per minute requires a resistance calculation to be made every one sixtieth of a second. If a common op amp, and common parts of the calculation portion, are being used for an embodiment having twenty five sensor elements, to provide the same measurement precision requires a resistance calculation to be made every ⅔ of a millisecond. At a frequency of 7.5 KHz (which as above indicated has been found to be a suitable frequency at which to operate the apparatus), this equates to one calculation every five cycles, and it has been found acceptable to provide valid calculations based upon five cycles.

It will be understood that the signal passing along the line 38 comprises a series of "packets" of alternating voltage, each packet being a signal indicative of the voltage drop across the resistor 30 when connected to a particular sensor element 6. Accordingly, there will be periodic steps in the amplitude of the signal, the steps occurring when the resistance of the rock adjacent one sensor element differs from the resistance of the rock adjacent the next sensor element. The signal passing along line 38 also includes noise.

As shown schematically in FIG. 5, the phase sensitive rectifier 56 comprises a set of two switches 60a and 60b, the switch 60a being connected directly to the output line 64, the switch 60b being connected to an inverter 62 and subsequently to the output line 64. The function of the inverter 62 is to invert the signal received, i.e. it changes a negative signal to a positive signal of the same magnitude, and vice versa.

In addition, the rectifier 56 receives a signal along the line 58 from the voltage generator 10. The rectifier 56 is set to operate the switches 60a,b when the signal from the generator 10 changes polarity. The signal along line 58 can be a trigger signal issued when the output of generator 10 changes polarity, or can comprise the signal from generator 10 with the changes in polarity being determined by componentry associated with the rectifier 56. Accordingly, when the signal from the generator 10 is positive (or negative, if desired) the switch 60a is closed and the switch 60b open, so that the positive half-wave (together with the noise) is transmitted to the output line 64; when the signal is negative (or positive, if desired) the switch 60a is open and the switch 60b is closed, the signal being inverted by the inverter 62 and passed to the output line 64. The function of the rectifier 56 is therefore to convert the incoming (alternating) signal containing a certain amount of noise into a rectified signal containing the same amount of noise (though the noise signal will change polarity together with the signal).

If desired or required, the signal passing along line 58 can be time-shifted to compensate for circuit delays. Also, whilst the exemplary embodiment is described for use in measuring the component of the current passing through the sensor element which is in phase with the applied voltage, it is sometimes desired to measure components of the current which are out of phase with the applied voltage (the "quadrature phase component"). By time-shifting the signal passing along line 58 to be deliberately out of phase with the voltage signal the apparatus can be used to measure the component of the current passing through the sensor element at any desired phase angle relative to the generator.

The rectified signal is then passed downstream to the integrators 66a or 66b. Considering integrator 66a for the present (though it will be understood that the components of, and connections to, the integrator 66b are identical), the line 64 passes to the inverting input of op amp 68a by way of a resistor 70 and a switch 72a. The inverting input of the op amp 68a is connected to a capacitor 74a in a feedback loop to the output of the op amp.

The non-inverting input of the op amp 68a is connected to earth by way of line 86, containing a switch 76a and a resistor 70'. The non-inverting input is also connected to earth by way of a capacitor 80a.

It will be understood that there is a substantially continuous stream of signal data passing along line 64, corresponding to the (alternating) voltage drop detected by the detecting portion 20 of the apparatus for each sensor element 6 in sequence. So that none of the signal need be lost, in this embodiment of the apparatus there is provided two integrators 66a,66b which can be alternately, or sequentially, switched into and out of the circuit, one integrator operating (to integrate a signal received) at a time.

The switches 72a, 76a, 72b and 76b control which of the two integrators 66a, 66b is integrating at any point in time. When the switches 72a and 76a are closed, the switches 72b and 76b are open, and the integrator 66a is integrating and the integrator 66b is being sampled, i.e. its output 88b is being measured; when the switches 72b and 76b are closed, the switches 72a and 76a are open, and the integrator 66b is integrating and the integrator 66a is being sampled, i.e. its output 88a is being measured.

Figure 6:
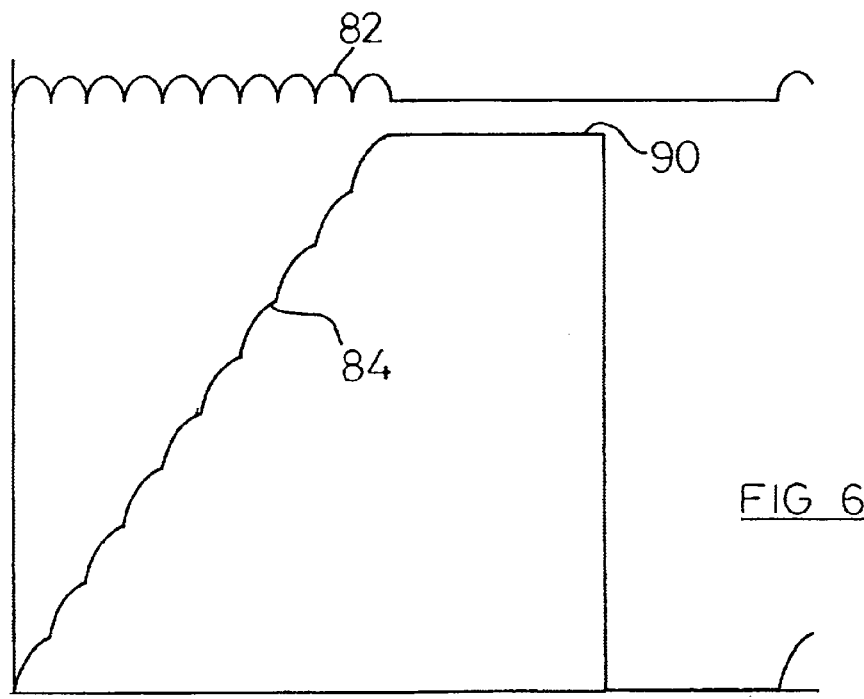
FIG. 6 shows an approximation of the input and output from an integrator of the calculation portion of FIG. 5.

Curve 82 of FIG. 6 represents the signal reaching the integrator 66a along the line 64. During a part of the cycle during which the switches 72a and 76a are closed the signal corresponds to the rectified voltage drop across the resistor 30 as it is connected to a particular sensor element 6 (together with noise, not shown). When the detection portion switches to the next sensor element, the switches 72a and 76a open, and the signal reaching the integrator 66a goes to zero (the signal for the next sensor element passes to the integrator 66b). The output of the integrator 66 is shown by curve 84, which rises in conformity with the amplitude of the signal passing along the line 64 (the output of the op amp 68a is dependent upon the difference between the signal passing along the line 64 and that passing along the line 86 (connected to earth)), and then remains substantially unchanged when the input is zero. During this latter phase of the cycle the output of the integrator 88a can be sampled, the value of the signal 90 being dependent upon the area under the curve 82, which is itself dependent upon the current flowing through the resistor 30 whilst the op amp 22 is connected to a particular sensor element 6.

The use of an integrator in this way removes substantially all of the noise with a period less than half the integration time, since this noise will alternately add and subtract from the signal during integration. The net effect of the noise will therefore be close to or equal to zero, and the integrated signal will have a value corresponding to the area under the signal curve, which area is directly dependent upon the current flowing through the sensor element 6 being detected. This is an improvement over a conventional filtering method since a filter's bandwidth must be greater than the signal frequency to avoid attenuating the signal, and so the filter only attenuates noise higher than the signal frequency. In contrast, the integrator attenuates noise with frequencies that are lower (longer period) than those of the signal while always increasing the signal. The longer the integration time, the greater the benefit.

As shown in FIG. 5, the non-inverting inputs of both op-amps 68a and 68b are connected to earth by way of a resistor 70'. In less desirable embodiments the non-inverting inputs can be connected directly to ground, but the described arrangement is preferred so as to overcome the practical difficulties involved with such a circuit. Specifically, the resistor 70' is arranged to be of the same value as the resistor 70, and the switches 76a, b are substantially identical to the switches 72a, b respectively. In this way, the leakages which can occur across the capacitors 74,80, and bias currents into the op amp inputs, which can result in significant voltage drops across the switches, are substantially the same at both inputs of the op amp, and so cancel each other out.

After the output of the integrator has been sampled, the integrator can be reset so that it retains no memory of the previous signal, and all subsequent signals are measured relative to a datum (in this embodiment earth or zero) rather than being possibly corrupted by previous signals. The resetting is achieved by closing the switches 92a, 92b respectively, which are open whilst the respective integrator is performing its integration and whilst it is being sampled, but can be closed to short circuit the capacitors 74a, b and 80a,b respectively, so as to place the inverting and non-inverting inputs of the respective op amp 68a,b to zero prior to the next integration being performed.

In this embodiment, the generator 10 is generating a signal with a frequency of 7.5 kHz, and a signal is being calculated every ⅔ of a millisecond, so that a calculation is performed every five cycles (or ten half-cycles). The switches 72a, b and 76a, b receive a (trigger or continuous) signal from the generator 10 and so can be timed to operate relative to the generator, and to open and close respectively at five-cycle intervals. The switches 92a, b can be similarly timed relative to the generator 10 to close and subsequently re-open once every ten cycles, though the point at which they are closed and subsequently opened will be determined to be after the integration is complete and the output has been sampled.

The output 88a, b of the integrators 66a, 66b are connected to an analogue to digital converter (not shown), which converts the calculated and sampled signal into a digital signal representative of the measured resistance of the rock adjacent a particular sensor element at a particular location; the digital signal can be communicated to the surface and processed with the other signals (from the other sensor pads of the tool) by control electronics (which are known in this art) to determine the location of the particular sensor 6 at the time at which each measurement was taken, and so equate the measured current flow with a physical location within the formation 4. In this way, a resistance "image" of the rock can be made up, and can be used to determine the rock strata and other information about the structure of the rock formation.

It will be understood that the portions 20, 48 of the circuits of the apparatus are shown schematically only. The circuits would in practice include other components, and the values of the components described would be chosen, to determine the precise operational characteristics of the apparatus, and, for example, the desire to increase the ratio of signal to noise. The choice and location of those elements would be within the capability of a person ordinarily skilled in the field of signal processing.

As above indicated, in the embodiment described five cycles of the alternating signal can be integrated for each sensor element. To improve the accuracy of the measurements made, it would be desirable to increase the number of cycles per measurement, but as above indicated there is a practical upper limit to the frequency which can be used due to attenuation and phase shifts within the rock formation; also, it is not desired to increase the number of cycles per measurement at the cost of precision of the apparatus. Five cycles has been found to achieve satisfactory results, and be a good compromise between the frequency utilized and the precision of the apparatus. It would, however, be possible to utilize fewer cycles per measurement, down to one half-cycle only, so that a lower frequency could be used, or a greater positional precision sought, though the use of only one half-cycle would be at the expense of a decreased signal to noise ratio.

What is claimed is:

1. An electrical measurement apparatus for measuring an electrical characteristic of earth formations comprising:
    a sensor element;
    a guard element;
    a generator for generating an alternating voltage;
    first connecting means for communicating the alternating voltage to the sensor element;
    second connecting means for communicating the alternating voltage to the guard element;
    an operational amplifier having:
        an inverting input, a non-inverting input and an output;
        a feedback loop between the output and the inverting input, the operational amplifier being configured as a voltage follower in which the voltage at the output matches the voltage at the non-inverting input;
        the output being connected to the sensor element, and the non-inverting input being connected to the generator, so that the operational amplifier forms part of the first connecting means; and
    a measurement resistor located within the feedback loop between the output and the sensor element.

2. The apparatus according to claim 1 having a plurality of separate sensor elements, and switching means for selectively connecting the output to each respective sensor element.

3. The apparatus according to claim 2 wherein the switching means comprises two switches for each sensor element, both of the switches being located within the feedback loop between the measurement resistor and the inverting input, and one of the switches forms part of the first connecting means.

4. The apparatus according to claim 2 wherein a respective further resistor is connected between the guard element and each sensor element.

5. The apparatus according to claim 4 wherein an electrical resistance of each of the further resistors is similar or identical.

6. An electrical measurement apparatus for measuring an electrical characteristic of earth formations comprising:
    a sensor element;
    a guard element;
    a generator for generating an alternating voltage;
    first connecting means for communicating the alternating voltage to the sensor element;
    second connecting means for communicating the alternating voltage to the guard element;
    a measurement resistor located within the first connecting means;
    a signal line connected to each side of the measurement resistor;
    a differentiating means connected to each of the signal lines, the signal lines communicating respective voltages at each side of the measurement resistor to the differentiating means, the differentiating means having an output signal corresponding to the difference between the respective voltages, the output signal being representative of a voltage drop across the measurement resistor;
    an integrator having an input connected to the differentiating means output signal to integrate the signal over a predetermined period of time.

7. The apparatus according to claim 6 wherein the calculator determines an amplitude of the signal.

8. The apparatus according to claim 6 having third connecting means to communicate the alternating voltage to the calculator, and wherein the predetermined period of time comprises a chosen number of half-cycles of the alternating voltage.

9. The apparatus according to claim 6 wherein a phase sensitive rectifier is located upstream of the integrator and downstream of the differentiating means.

10. The apparatus according to claim 6 having two integrators, and switches to control the operation of the integrators so that each integrator carries out an integration alternately, and so that each integrator can be sampled, and then reset whilst not carrying out an integration.

11. The apparatus according to claim 10 wherein each integrator comprises an operational amplifier having:
    an inverting input, a non-inverting input and an output, a signal to be measured being communicated to the inverting input;
    a first capacitor located between the inverting input and the output;
    a second capacitor located between the non-inverting input and a zero reference voltage;
    a first switch provided across the first capacitor; and
    a second switch is provided across the second capacitor, the first and second switches being provided to short-circuit the respective capacitors to reset the integrator.

12. The apparatus according to claim 4 in which a first resistor is located upstream of the inverting input, and a second resistor is connected between the non-inverting input and the zero reference voltage, the first and second resistors having the same electrical resistance.

13. An electrical measurement apparatus for measuring an electrical characteristic of earth formations comprising:
    a sensor element;
    a guard element;
    a generator for generating an alternating voltage;
    first connecting means for communicating the alternating voltage to the sensor element;
    second connecting means for communicating the alternating voltage to the guard element;
    a detector for obtaining a signal representative of the current flowing through the first connecting means, the detector including an operational amplifier having:
        an inverting input, a non-inverting input and an output;
        a feedback loop between the output and the inverting input, the operational amplifier being configured as a voltage follower in which the voltage at the output matches the voltage at its non-inverting input,
        the output being connected to the sensor element, and the non-inverting input being connected to the generator, so that the operational amplifier forms part of the first connecting means, a measurement resistor located within the feedback loop between the output and the sensor element;

a signal line connected to each side of the measurement resistor;

a differentiating means connected to each of the signal lines, the signal lines communicating respective voltages at each side of the measurement resistor to the differentiating means, the differentiating means having an output signal corresponding to the difference between the respective voltages, the output signal being representative of a voltage drop across the measurement resistor;

a phase sensitive rectifier for rectifying the output signal of the differentiating means;

an integrator for integrating the rectified output signal of the differentiating means over a predetermined period of time;

third electrical circuit componentry connecting the generator to the phase sensitive rectifier; and fourth electrical circuit componentry connecting the generator to the integrator.

14. An electrical measurement apparatus for measuring an electrical characteristic of earth formations comprising:

a sensor element;

a guard element;

a generator for generating an alternating voltage;

first electrical circuit componentry for communicating the alternating voltage to the sensor element;

second electrical circuit componentry for communicating the alternating voltage to the guard element;

an operational amplifier having:
an inverting input, a non-inverting input and an output;
a feedback loop between the output and the inverting input, the operational amplifier being configured as a voltage follower in which the voltage at the output matches the voltage at its non-inverting input;
the output being connected to the sensor element, and the non-inverting input being connected to the generator, so that the operational amplifier forms part of the first electrical circuit componentry; and a measurement resistor located within the feedback loop between the output and the sensor element.

15. An electrical measurement apparatus for measuring an electrical characteristic of earth formations comprising:

a sensor element;

a guard element;

a generator for generating an alternating voltage;

first electrical circuit componentry for communicating the alternating voltage to the sensor element;

second electrical circuit componentry for communicating the alternating voltage to the guard element;

a measurement resistor located within the first circuit componentry;

a signal line connected to each side of the measurement resistor;

a differential amplifier having an input connected to each of the signal lines, the signal lines communicating respective voltages at each side of the measurement resistor to the differential amplifier, the differential amplifier having an output signal corresponding to the difference between the respective voltages, the output signal being representative of a voltage drop across the measurement resistor;

an integrator having an input connected to the output signal of the differential amplifier to integrate the signal over a predetermined period of time.

16. An electrical measurement apparatus for measuring an electrical characteristic of earth formations comprising:

a sensor element;

a guard element;

a generator for generating an alternating voltage;

first electrical circuit componentry for communicating the alternating voltage to the sensor element;

second electrical circuit componentry for communicating the alternating voltage to the guard element;

a detector for obtaining a signal representative of the current flowing through the first electrical circuit componentry, the detector including an operational amplifier having:
an inverting input, a non-inverting input and an output;
a feedback loop between the output and the inverting input, the operational amplifier being configured as a voltage follower in which voltage at the output matches voltage at the non-inverting input,
the output being connected to the sensor element, and the non-inverting input being connected to the generator, so that the operational amplifier forms part of the first electrical circuit componentry
a measurement resistor located within the feedback loop between the output and the sensor element;

a signal line connected to each side of the measurement resistor;

a differentiating means connected to each of the signal lines, the signal lines communicating the respective voltages at each side of the measurement resistor to the differentiating means, the differentiating means having an output signal corresponding to the difference between the respective voltages, the output signal being representative of the voltage drop across the measurement resistor;

a phase sensitive rectifier for rectifying the output signal of the differentiating means;

an integrator for integrating the rectified output signal of the differentiating means over a predetermined period of time;

third electrical circuit componentry connecting the generator to the phase sensitive rectifier; and fourth electrical circuit componentry connecting the generator to the integrator.

17. A method of measuring the electrical resistance of a region comprising the steps of:

locating a measurement apparatus so that a sensor element of the measurement apparatus is adjacent the region, wherein the measurement apparatus further includes:
a guard element;
a generator for generating an alternating voltage;
first connecting means for communicating the alternating voltage to the sensor element;
second connecting means for communicating the alternating voltage to the guard element;
an operational amplifier having:
an inverting input, a non-inverting input and an output;
a feedback loop between the output and the inverting input, the operational amplifier being configured as a voltage follower in which the voltage at the output matches the voltage at the non-inverting input;

the output being connected to the sensor element, and the non-inverting input being connected to the generator, so that the operational amplifier forms part of the first connecting means; and a measurement resistor located within the feedback loop between the output and the sensor element;

generating an alternating voltage and communicating the alternating voltage to the sensor element and guard element; and detecting the current flowing through the first connecting means.

18. A method of measuring the electrical resistance of a region comprising the steps of:

locating a measurement apparatus so that a sensor element of the measurement apparatus is adjacent the region, wherein the measurement apparatus includes:
a guard element;
a generator for generating an alternating voltage;
first connecting means for communicating the alternating voltage to the sensor element;
second connecting means for communicating the alternating voltage to the guard element;
a detector for obtaining a signal representative of the current flowing through the first connecting means; and
a calculator for determining a measure of the current flowing through the first connecting means, the calculator including an integrator to integrate the signal over a predetermined period of time;

generating an alternating voltage and communicating the alternating voltage to the sensor element and guard element; and integrating the signal over a chosen even number of half-cycles of the alternating voltage.

19. A method of measuring the electrical resistance of a region comprising the steps of:

locating a measurement apparatus so that a sensor element of the measurement apparatus is adjacent the region, wherein the measurement apparatus includes:
a guard element;
a generator for generating an alternating voltage;
first connecting means for communicating the alternating voltage to the sensor element;
second connecting means for communicating the alternating voltage to the guard element;
a detector for obtaining a signal representative of the current flowing through the first connecting means, the detector including an operational amplifier having:
an inverting input, a non-inverting input and an output;
a feedback loop between the output and the inverting input, the operational amplifier being configured as a voltage follower in which the voltage at the output matches the voltage at its non-inverting input,
the output being connected to the sensor element, and the non-inverting input being connected to the generator, so that the operational amplifier forms part of the first connecting means,
a measurement resistor located within the feedback loop between the output and the sensor element;
a signal line connected to each side of the measurement resistor;
a differentiating means connected to each of the signal lines, the signal lines communicating respective voltages at each side of the measurement resistor to the differentiating means, the differentiating means having an output signal corresponding to the difference between the respective voltages, the output signal being representative of a voltage drop across the measurement resistor;
a phase sensitive rectifier for rectifying the output signal of the differentiating means;
an integrator for integrating the rectified output signal of the differentiating means over a predetermined period of time;
third electrical circuit componentry connecting the generator to the phase sensitive rectifier;
fourth electrical circuit componentry connecting the generator to the integrator generating an alternating voltage and communicating this to the sensor element and guard element; and
integrating the rectified output signal of the differentiating means over a chosen even number of half-cycles of the alternating voltage.

* * * * *